United States Patent [19]

Pittman

[11] Patent Number: 4,621,529
[45] Date of Patent: Nov. 11, 1986

[54] MULTI-SENSOR PICKOFF ASSEMBLY
[75] Inventor: Roland Pittman, Montclair, N.J.
[73] Assignee: The Singer Company, Little Falls, N.J.
[21] Appl. No.: 745,055
[22] Filed: Jun. 17, 1985
[51] Int. Cl.⁴ .............................................. G01P 9/02
[52] U.S. Cl. ...................................... 73/504; 73/510; 74/5 F
[58] Field of Search .................... 73/504, 510; 74/5 F, 74/5.6 D; 310/329

[56] References Cited
U.S. PATENT DOCUMENTS

| | | | |
|---|---|---|---|
| 4,211,951 | 7/1980 | Jensen | 310/329 |
| 4,311,046 | 1/1982 | Pittman | 73/510 |
| 4,386,535 | 6/1983 | Albert | 73/504 |

Primary Examiner—Stewart J. Levy
Assistant Examiner—John E. Chapman, Jr.
Attorney, Agent, or Firm—Thomas W. Kennedy

[57] ABSTRACT

A navigation sensor, including a gyroscopic element, which has a spin axis, and which has flexure hinge for resiliently mounting the element on a base, and a torque sensing assembly, which has a first piezoelectric beam that is mounted in coaxial relation to the spin axis, and which has a first beam restraining member that mounts a first edge portion of the first piezoelectric beam, and which has a second beam restraining member that mounts an opposite edge portion of the first piezoelectric beam. The first piezoelectric beam is adapted to generate an electrical signal proportional to the angular velocity of the navigation sensor about an axis perpendicular to the spin axis.

10 Claims, 5 Drawing Figures

MULTI-SENSOR PICKOFF ASSEMBLY

FIELD OF THE INVENTION

The present invention relates to gyroscopic multisensor assemblies, and more particularly to such an assembly for achieving rate and acceleration sensing.

BACKGROUND OF THE INVENTION

Guidance systems for modern aircraft require rate and acceleration sensing. Conventionally, this is achieved with the utilization of a gyroscopic multisensor assembly which operates by sensing an angular velocity about some axis perpendicular to the spin bearing axis of the device with the use of a gyroscopic element. This gyroscopic element is mechanically restrained by a piezoelectric crystal beam so that gyroscopic reaction to angular velocity mechanically strains the piezoelectric crystal beam which in turn produces an electrical output proportional to angular velocity input. Similarly, a restrained piezoelectric crystal beam can be employed to sense linear acceleration along any axis perpendicular to the spin bearing axis. Thus, through the use of one or more mechanically restrained piezoelectric crystal beams, both the angular velocity and acceleration amplitudes may be converted into electrical signals.

In may prior art devices, slip rings are employed to connect the piezoelectric crystal beam outputs with electrical processing circuits. The effect is to introduce slip ring noise into the circuits which reduces the signal-to-noise ratio, indicative of performance.

Further, prior art devices were subject to picking up spin bearing noise. This is due to the mounting of piezoelectric crystal beams along axes which were sensitive to the effects of spin bearing end play noise, again having the effect of lowering the signal-to-noise ratio.

Certain prior art attempts to rectify these problems resulted in the utilization of complex assemblies incorporating a great many parts at great expense while limiting the increase in performance.

BRIEF DESCRIPTION OF THE PRESENT INVENTION

The present invention solves the problems of the prior art by accomplishing two significant advantages:

It minimizes the effect of slip ring noise on the instrument electronics. This is accomplished by increasing the rate scale factor (electrical signal for a given angular velocity or rate input—MV/°/sec). This increase in scale factor raises the instrument performance level over previous designs.

It minimizes the effect of spin bearing noise. By mounting the piezoelectric crystal beam such that its mounting ends are aligned with the spin axis, the crystal beam insensitive axis becomes oriented along the spin bearing axis. This minimizes the effect of spin bearing end play noise and raises the instrument performance level over previous designs.

The present invention operates by sensing an angular velocity about some axis perpendicular to the spin bearing axis with the use of a gyroscopic element. This gyroscopic element is mechanically restrained by a piezoelectric crystal beam, mounted such that its supported ends are aligned with the bearing spin axis. The gyroscopic reaction to an angular velocity mechanically strains the piezoelectric crystal beam which in turn produces an electrical output proportional to the angular velocity input.

This electrical signal is inputted to supportive electronics such that the angular velocity amplitude and its angular location relative to the instrument case can be determined.

Combining this angular velocity sensor with one or more acceleration sensor piezoelectric crystal beams produces an assembly which is capable of sensing both angular velocity and linear acceleration along any axis orthogonal to the spin axis. The velocity sensor is integrated with the acceleration sensor to form a low cost improved structure.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1A:
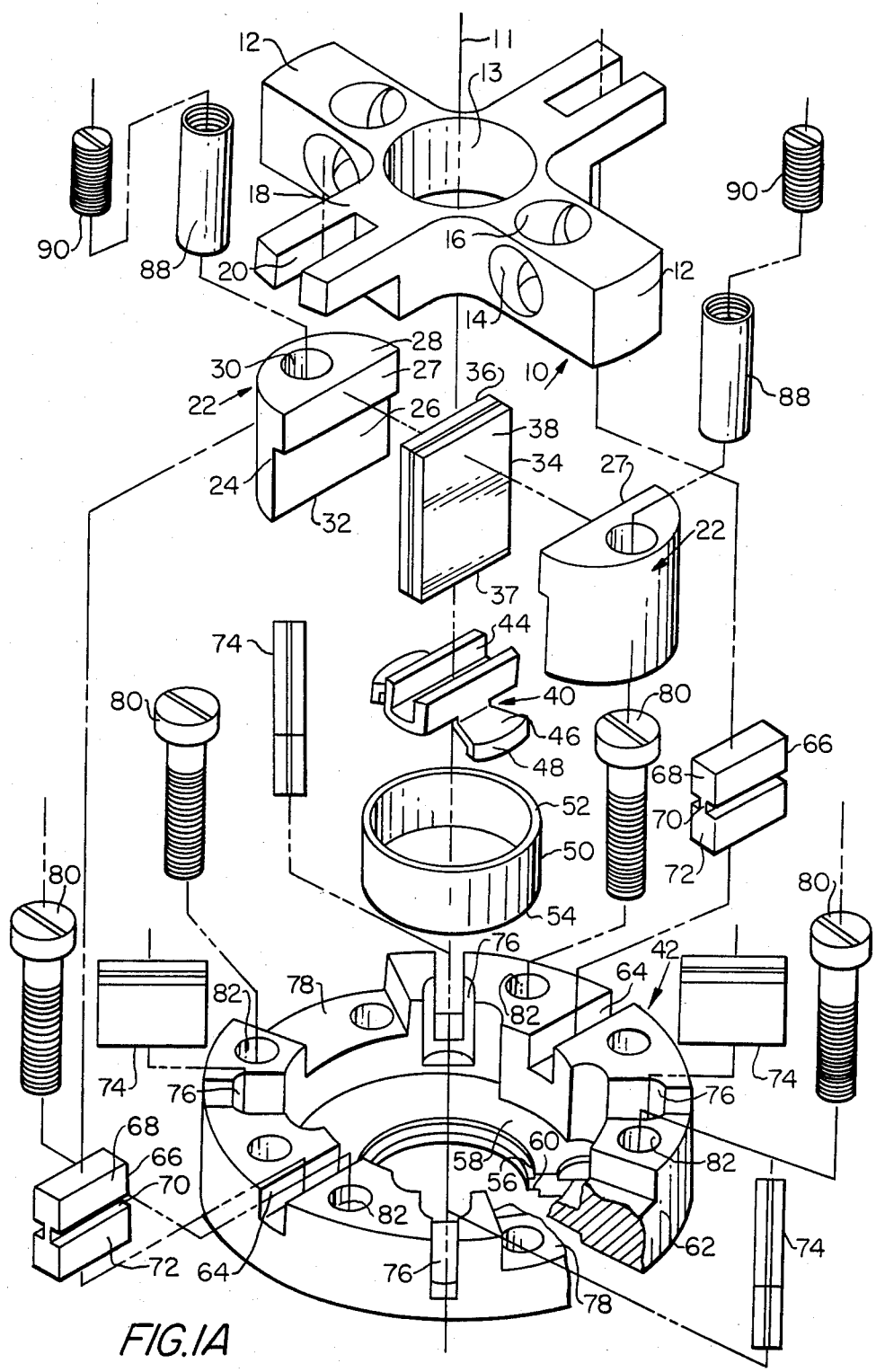
FIG. 1A is a disassembled view of a multisensor pickoff assembly constructed in accordance with the present invention.
Figure 1B:
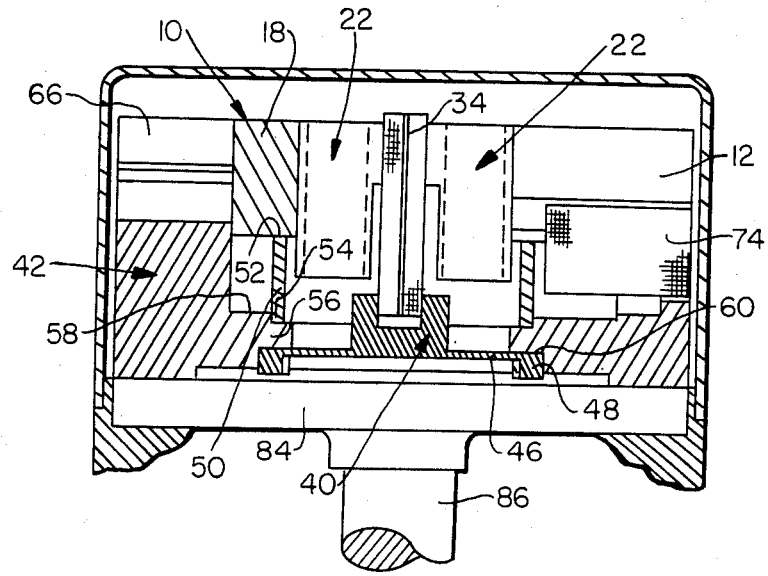
FIG. 1B is a partial sectional view indicating the assembled components of FIG. 1A.
Figure 1C:
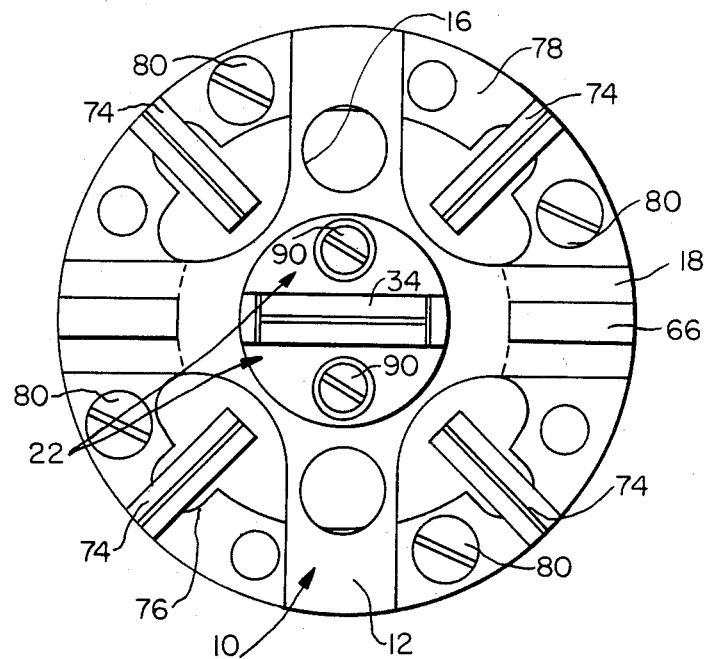
FIG. 1C is a top plan view of the assembly illustrated in FIGS. 1A and 1B.

Referring to FIGS. 1A–1C, the structure of a navigation sensor according to the present invention is illustrated in detail. Reference numeral 10 generally indicates a gyroscopic element which rotates about spin axis 11 and has arms 12 extending diametrically outwardly from a centrally formed bore 13. Each of the arms 12 has orthogonally formed bores 14 and 16 located therein for weight reduction.

Diametrically extending bifurcated arms 18 extend orthogonally from the arms 12 and each includes a slot 20 formed therein for receiving an upper end of a flexure hinge 66.

The generally semi-cylindrical restraining members 22 are positioned within bore 13 and serve to restrain the piezoelectric crystal beam 34 therebetween. Each of the members 22 includes a generally semi-cylindrical surface 24 and a plane surface 26 opposite thereto which steps up to portion 27 having a generally rectangular surface which abuts a corresponding surface 36, 38 of the piezoelectric crystal beam 34. A vertical bore 30 extends from the upper surface 28 of the member 22 through the lower surface 32 and is used to mount an adjustable weight screw assembly, as will be discussed hereinafter. The lower portion of piezoelectric crystal beam 34 is received within a keeper, generally indicated by reference numeral 40, the latter being positioned within base 42 of the inventive device. The keeper includes a slotted section 44 for contacting the lower portion of the piezoelectric crystal beam 34 while outwardly extending wing sections 46 append perpendicularly from the slotted section 44 and serve as shoulders for the device when inserted in the base 42. An arcuate flange 48 depends downwardly from wing sections 46 to be received within circular groove 60 formed in the underside of the base annular flange 58, as more clearly shown in FIG. 1B.

The gyroscopic element 10 rests upon the upper surface 52 of a ring 50 as more clearly shown in FIG. 1B. The lower annular surface 54 of ring 50 is received within annular groove 56 formed in base annular flange 58 again shown most clearly in FIG. 1B.

Referring now to FIG. 1A, the cylindrical side wall 62 of base 42 has diametrically opposite slots 64 formed therein for receiving lower sections of flexure hinge 66. As clearly shown in FIG. 1A, each flexure hinge 66 includes upper and lower flange sections 68 and 72, separated by a web 70. The wall 62 of base 42 includes four slots 76 formed therein, in quadrature, the flexure hinge slots 64 being angularly disposed at 45° relative to adjacently positioned slots 76.

The gyroscopic element arms 12 are positioned within elongated angular slots 78 formed in the wall 62 of base 42, as seen in FIGS. 1A and 1C.

When the components of the inventive device are assembled, bolts 80 pass through bores 82 formed in the upper surface of base 42 for securing driveshaft flange 84 (FIG. 1B) to the remaining assembly. In the latter-mentioned figure, the driveshaft is indicated at 86. In the upper left-hand corner of FIG. 1A, a threaded bushing 88 is seen to be positioned within bore 30 of restraining member 22 and within the bushing 88 is located a threaded member 90. By adjusting the position of threaded member 90 within bushing 88, the inventive device may be adjusted for balance.

When assembled the gyroscopic element 10 is mounted to base 42 by the two flexure hinges 66. These components are restrained about the flexure hinge axis by the torque sensing assembly of parts comprising both restraining members 22, piezoelectric crystal beam 34 and keeper 40. The piezoelectric crystal beams 74 are mounted in base slots 76 to sense linear acceleration during operation of the device.

The invention further operates by sensing an annular velocity about some axis perpendicular to the spin bearing axis with the use of a gyroscopic element 10. This gyroscopic element is mechanically restrained by a piezoelectric crystal beam 34, mounted such that its supported ends are aligned with the bearing spin axis. The gyroscopic reaction to an angular velocity, mechanically strains the piezoelectric crystal beam 34 which in turn produces an electrical output proportional to the angular velocity input.

This electrical signal is inputted to a supportive electronics instrument such that the angular velocity amplitude and its angular location relative to an instrument case (not shown) can be determined.

Combining this angular velocity sensor with one or more acceleration sensor piezoelectric crystal beams produces an assembly which is capable of sensing both angular velocity and linear acceleration along any axis orthogonal to the spin axis. The velocity sensor is integrated with the acceleration sensor to form a low cost improved structure.

Figures 2, 3:
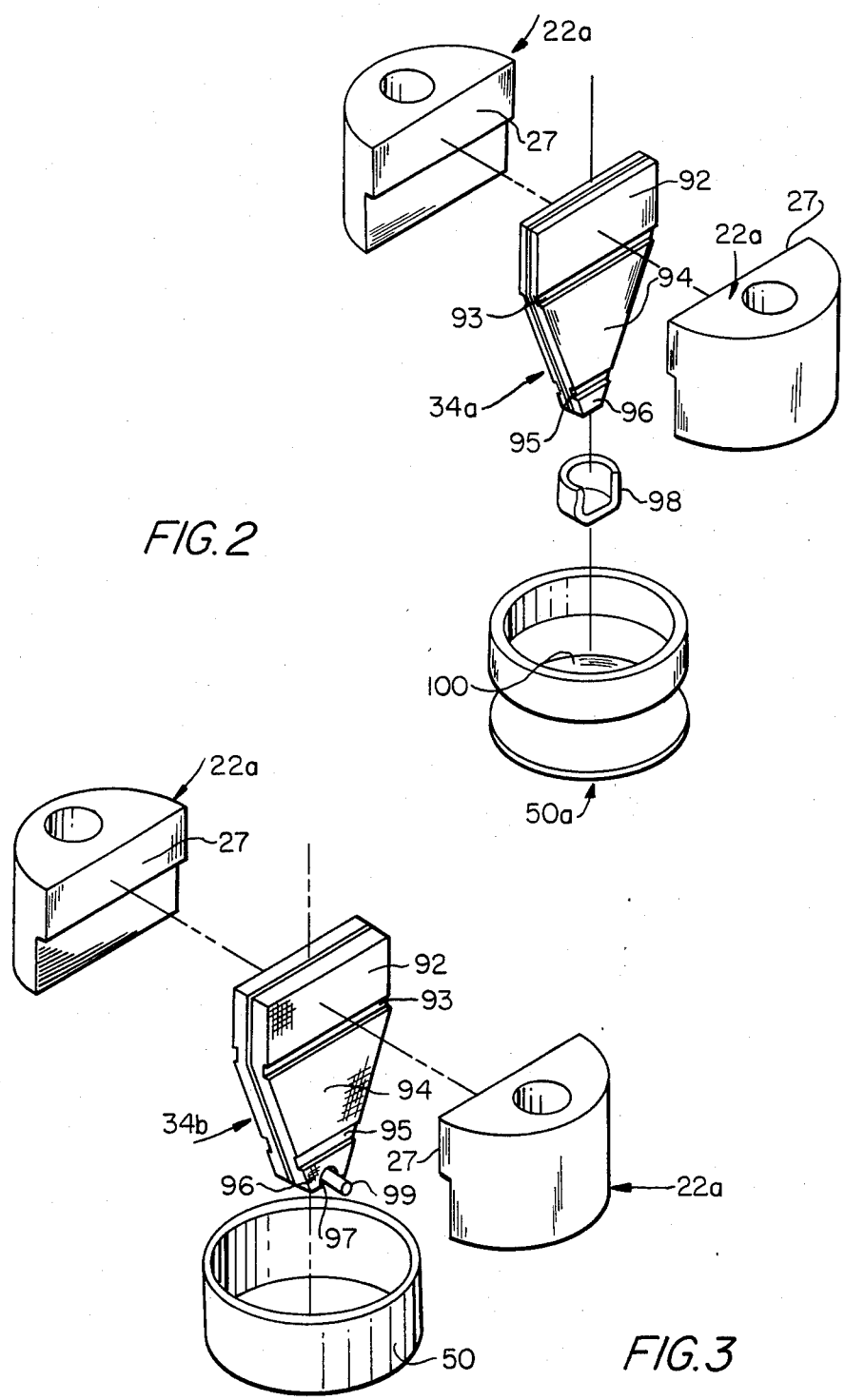
FIG. 2 is a disassembled view of an alternate embodiment of a portion of FIG. 1A.
FIG. 3 is a disassembled view of another alternate embodiment of a portion of FIG. 1A.

FIG. 2 shows a modification of the angular velocity sensing piezoelectric crystal beam previously indicated by reference numeral 34 in FIG. 1A, now modified as shown by reference numeral 34a in FIG. 2. Identical components are indicated by identical reference numerals while modified components in FIG. 2 are denoted with the letter "a" following the corresponding reference numeral used in FIG. 1A.

As shown in FIG. 2, piezoelectric crystal beam 34a is a generally trapezoidal-shaped member having a base shoulder portion 92 separated from a central portion 94 by a lateral indentation 93. Similarly, the central portion 94 is separated from a truncated apex portion 96 by a lateral indentation 95. Each of the restraining members 22a includes a raised shoulder portion 27 which abuts a confronting surface of beam shoulder portion 92. The apex portion 96 fits within a receptacle 98 so that beam 34a is supported on the upper and lower edges thereof. The receptacle 98 is received within a conforming indentation (not shown) formed in base 100 of ring 50a. As in the case of the principal embodiment previously described in connection with FIGS. 1A–1C, the ring 50a receives the restraining members 22a and the piezoelectric crystal beam 34a abutted therebetween. By including the lateral indentations 93 and 95 in beam 34a, the central portion 94 is better capable of exhibiting flexing displacement in response to angular velocity changes.

FIG. 3 is a modification of the piezoelectric crystal beam 34a (as previously described in connection with FIG. 2) and in its further modified form is indicated by 34b shown in FIG. 3. The difference between the beams shown in FIGS. 2 and 3 is the replacement of receptacle 98 in FIG. 2 by a pin 99 passing through a semi-cylindrical slot 97 formed in the apex portion 96 of the beam 34b. The pin 99 has its outward ends retained (not shown) within the base of the device. As in the case of the principal embodiment of FIGS. 1A–1C, a ring 50 receives the restraining members 22a as well as the beam 34b restrained therebetween.

It should be understood that the invention is not limited to the exact details of construction shown and described herein for obvious modifications will occur to persons skilled in the art.

I claim:

1. A navigation sensor comprising:
   a gyroscopic element for rotation about a spin axis;
   a torque sensing assembly, including:
   (a) a first piezoelectric beam mounted in coaxial relation to the spin axis;
   (b) first beam restraining means for mounting a first edge portion of the beam transverse to the spin axis and within the gyroscopic element;
   (c) second beam restraining means for mounting an opposite edge portion of the beam transverse to the spin axis and within the gyroscopic element;
   (d) keeper means for mounting the beam to a base, wherein the resulting restrained beam of the torque sensing assembly generates an electrical signal proportional to the angular velocity of the navigation sensor about an axis perpendicular to the spin axis; and
   at least one flexure hinge for resiliently mounting the gyroscopic element to the base.

2. The structure set forth in claim 1 together with at least a second piezoelectric beam mounted in uniform spaced relation to the axis for generating an electric signal proportional to linear acceleration of the sensor in a direction perpendicular to the spin axis for permitting multisensor operation.

3. The structure set forth in claim 2 wherein four of said second piezoelectric beams are mounted in quadrature in the base.

4. The structure set forth in claim 1 wherein the gyroscopic element comprises:

a first pair of diametrically opposite arms extending from a central opening;

a second pair of diametrically opposite arms orthogonal to the first pair and likewise extending from a central opening;

wherein the central opening receives the first and second beam restraining means and the first piezoelectric beam restrained therebetween.

5. The structure set forth in claim 4 wherein the second pair of arms has slots formed therein for receiving a first portion of the flexure hinge while an opposite portion thereof is received in the base.

6. The structure set forth in claim 5 together with an input shaft connected to the base for imparting angular velocity thereto.

7. The structure set forth in claim 6 together with means inserted in the first and second restraining means for adjusting the rotational balance of the torque sensing assembly.

8. The structure set forth in claim 6 wherein the first piezoelectric beam has the shape of a parallelogram.

9. The structure set forth in claim 6 wherein the first piezoelectric beam is trapezoidal, having at least one indentation therein for facilitating flexing of the beam.

10. The structure set forth in claim 7 wherein the adjusting means are threaded members adjustably inserted or withdrawn from the torque sensing assembly.

* * * * *